Nov. 25, 1969    J. LIDSKY    3,479,919
PRONGED FASTENERS FOR STRUCTURAL MEMBERS
Filed April 12, 1967

INVENTOR.
JULIUS LIDSKY
BY
ATTORNEYS

United States Patent Office 3,479,919
Patented Nov. 25, 1969

3,479,919
PRONGED FASTENERS FOR STRUCTURAL MEMBERS
Julius Lidsky, Miami Beach, Fla., assignor to Ronel Corporation, Miami, Fla., a corporation of Florida
Filed Apr. 12, 1967, Ser. No. 630,307
Int. Cl. F16b *15/00;* E04b *1/38*
U.S. Cl. 85—13                         9 Claims

ABSTRACT OF THE DISCLOSURE

A pronged fastener for connecting together structural members made of wood or similar material capable of being penetrated by metal prongs. The fastener is in the form of a metal plate having a plurality of prongs projecting from one face thereof, and these prongs are composed of groups of prongs which respectively have different lengths, so that when the fastener is applied to a pair of structural members only the group of longest prongs will be required initially to penetrate into the structural members. Each prong has a pair of opposed side edges and an end edge which is inclined to and extends between these side edges so as to provide each prong with a pointed tip terminating at the longer of its side edges. These prongs are arranged in rows in which successive prongs of each row respectively have their end edges oppositely inclined with respect to each other. In addition, the prongs are arranged in two groups of different lengths with the prongs of each row being arranged with one relatively long prong followed by a relatively short prong, so that the prongs of different lengths alternate with each other in each row. The plate is formed at its face which is opposed to that from which the prongs project with V-grooves, and the prongs are struck from those portions of the plate which are formed with the V-grooves, so that each prong is of a V-shaped cross section.

BACKGROUND OF THE INVENTION

The invention relates to fasteners for fastening together structural members made of wood or similar material capable of being penetrated by metal prongs.

While fasteners of this general type are known, the conventional fasteners suffer from several drawbacks. In the first place, the prongs which are required to penetrate into the wood or the like are generally weak so that they bend easily. Furthermore, if the force which drives the pronged fastener into the structural member is not properly oriented, the fastener will be angularly displaced in an undesirable manner, instead of being driven directly into the structural members, with the result that the prongs or teeth also become undesirably bent and a proper fastening cannot be achieved. In addition, extremely large forces are required to drive the conventional fasteners into the structural members because there are generally a large number of prongs which must be simultaneously driven into the wood or other penetrable material of the structural members. Also, it is customary to bend the prongs from the metal plates which form the fasteners, and where this bending takes place at an angle which is on the order of 90°, for example, rupturing of the metal and cracking thereof at its joint between the plate and prong often occurs, resulting in fasteners which are of poor quality and which must be rejected in many cases.

Furthermore, with conventional pronged fasteners of the above general type, a reliable fastening of a pair of structural members to each other is not always achieved because the holding power of conventional pronged fasteners of this type is relatively low. The plate with the prongs projecting therefrom often works loose from the structural members. Thus, the conventional pronged fastener plates do not reliably grip the structural members which are fastened to each other but instead rely primarily on the frictional engagement of the side surfaces of the prongs with the material of the structural members to hold the latter together.

SUMMARY OF THE INVENTION

It is accordingly a primary object of the present invention to provide a pronged fastener of the above general type which will, however, avoid the above drawbacks.

Thus, it is an object of the present invention to provide a pronged fastener plate which can be reliably driven into a pair of structural members without requiring driving forces of the magnitude required by conventional pronged fasteners of the same general size.

Also, it is an object of the present invention to provide a fastener of the above general type with strong teeth or prongs which will not rupture or crack at their junctions with the plate and which will not bend when being driven into the structural members.

Furthermore, it is an object of the present invention to provide a pronged fastener of the above general type which will be reliably driven straight into the structural members even if the driving force is not properly oriented, so that if this latter force is angularly directed with respect to the surfaces of the structural members into which the prongs are driven the prongs nevertheless will be driven perpendicularly with respect to these latter surfaces into the material of the structural members.

Also, it is an object of the present invention to provide for a fastener of the above type a plate which is very strong even though it has a relatively small thickness.

In addition, it is an object of the present invention to provide a fastener plate of the above general type which can be readily manufactured in a highly reliable manner in such a way as to achieve all of the above objects at a relatively low cost.

In accordance with the invention, the fastener includes a plate having a plurality of prongs projecting from one of the faces thereof, and in accordance with one feature of the invention these prongs are composed of groups of prongs which are respectively of different lengths, so that initially only the group of longest prongs will be required to penetrate into the structural members, thus reducing the magnitude of the total force required to drive the fastener into the structural members. Each prong has a pair of opposed side edges and an end edge extending between these side edges at an angle thereto which provides each prong with a pointed tip terminating at the longer of the side edges thereof. The prongs are arranged in rows in which the inclined end edges thereof are oppositely inclined for each pair of successive prongs of each row, so that in this way when the fastener of the invention is driven into a pair of structural members the oppositely inclined end edges will tend to direct the prongs into different directions, thus increasing the holding power of the fastener and guaranteeing that the prongs will advance straight into the structural members even though the driving force is not precisely oriented in a direction which is perpendicular to the surfaces of the structural members which are initially penetrated by the prongs. The plate is formed, at its face which is opposed to that from which the prongs project, with a plurality of V-grooves, and the prongs are struck from those grooves of the plate which are formed with the V-grooves, so that the prongs themselves are of a V-shaped cross section while the plate has at its joints with the prongs also a V-shaped cross section, thus providing prongs or teeth of great strength as well as preventing any possibility of rupture or other failure at the place where the prongs are joined to the plate from which they are struck.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF A PREFERRED EMBODIMENT

Figure 1:
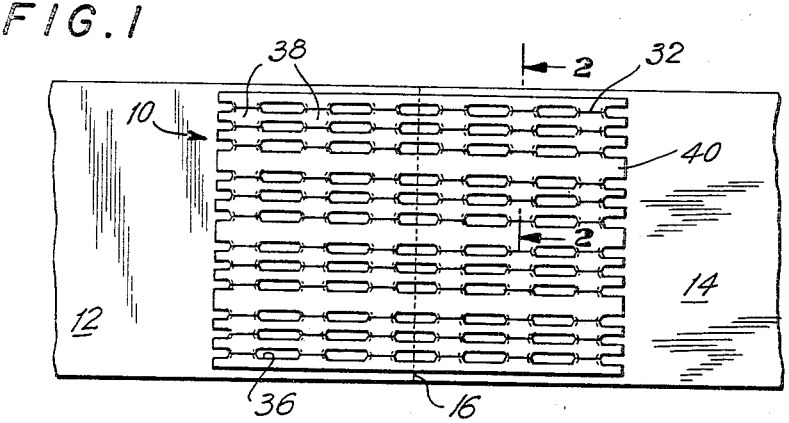
FIG. 1 is a top plan view showing a pair of structural members fastened together with a pronged fastener of the invention.

Referring now to the drawings, FIG. 1 illustrates how a fastener 10 of the invention is used to fasten together a pair of structural members 12 and 14, for example, made of wood or other material capable of being penetrated by metal prongs. The structural members 12 and 14 are shown in end-to-end relation in FIG. 1 with their ends abutting each other at the plane 16 indicated by a dot-dash line in FIG. 1.

Figure 3:
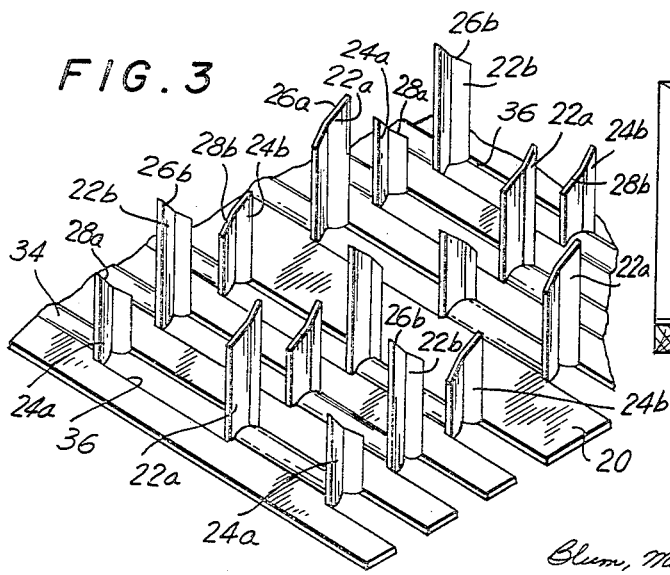
FIG. 3 is a fragmentary perspective illustration, also at an enlarged scale as compared to FIG. 1, showing the fastener of the invention as it appears when looking toward that face thereof from which the prongs project.

The fastener 10 of the invention is in the form of a metal plate 18 which has a face 20, visible in FIG. 3, from which a plurality of prongs project, as indicated in FIG. 3.

These prongs are arranged in two groups, and in subgroups within each group. Thus, one group of prongs is composed of prongs 22a and 22b which are of a given length, while a second group of prongs are composed of prongs 24a and 24b which have a length shorter than the group composed of prongs 22a and 22b.

In the group of prongs composed of the longer prongs 22a and 22b, there is a sub-group 22a all of which have end edges 26a inclined in one direction, downwardly from right to left, as viewed in FIG. 3. The second sub-group 22b of the longer group of prongs terminate in end edges 26b which are inclined in a direction opposite to the inclined end edges 26a. Thus, the end edges 26b are inclined downwardly from the left to the right, as viewed in FIG. 3.

In the same way, with respect to the shorter group of prongs 24a, 24b, it will be seen that the sub-group 24a is composed of prongs terminating in end edges 28a which are inclined downwardly from left to right, as viewed in FIG. 3. The sub-group of shorter prongs 24b, on the other hand, respectively terminate in end edges 28b, which are inclined downwardly from right to left, as viewed in FIG. 3.

Furthermore, it will be seen that the prongs are arranged in rows with the successive prongs of each row having their end edges oppositely inclined with respect to each other.

Figure 2:
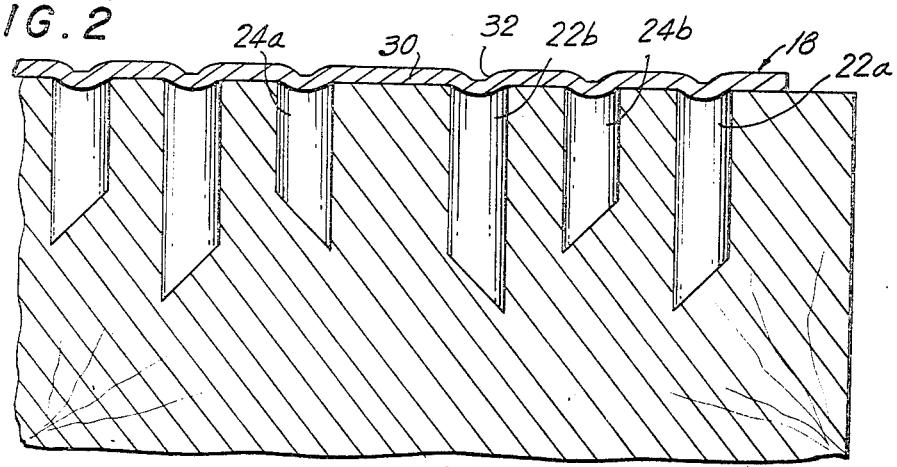
FIG. 2 is a fragmentary transverse section, at an enlarged scale as compared to FIG. 1, taken along line 2—2 of FIG. 1 in the direction of the arrows and showing details of the fastener of the invention.

As is apparent from the drawings, and from FIGS. 2 and 3 in particular, each prong has a pair of opposed side edges one of which is longer than the other, and each prong terminates in an inclined end edge extending between its side edges, thus providing each prong with a pointed tip terminating at the longer side edge of each prong.

Furthermore, the prongs are arranged in the rows with a prong of the long group 22a, 22b situated between a pair of prongs of the short group 24a, 24b, so that not only are the end edges of successive prongs of each row oppositely inclined, but in addition the groups of prongs are arranged with the long and short prongs alternating with each other along each row of prongs.

At its face 30, which is opposed to its face 20, the plate 18 is formed with a plurality of parallel V-grooves 32 which greatly strengthen the plate. These V-grooves 32 provide the plate at its face 20 with V-ribs 34 which strengthen the plate. The prongs are struck from those portions of the plate which are formed with the V-grooves 32, so that each prong has a V-shaped cross section, and thus the prongs themselves are in the form of very strong teeth, as a result of this construction. When the prongs are struck from the plate so as to be bent at an angle of 90° with respect thereto, there is no possible cracking or other rupture at the joint between a prong and the plate because of the strength imparted to the structure by the V-grooves 32 which, it will be noted, situate the ribs 34 precisely at the junctions between the prongs and the plate.

When the prongs are struck from the plate, slots 36 are formed in the plate, and these slots are longitudinally distributed along the V-grooves 32 while also being arranged in transverse rows, as is particularly apparent from FIG. 1. The result is that the plate 18 is provided between the rows of slots 36 with the transverse elongated portions 38 (FIG. 1) which reinforce the plate and which extend between the transverse rows of prongs. These prongs also are, of course, arranged in longitudinal rows along the V-grooves 32. As is apparent from FIG. 1, in the illustrated example the V-grooves 32 are arranged in groups of three with each group of three V-grooves 32 separated by an elongated portion 40 of the plate 18. These elongated portions 40 extend longitudinally of the plate 18 perpendicularly with respect to their elongated portions 38, thus provided further reinforcement of the plate.

Figure 4:
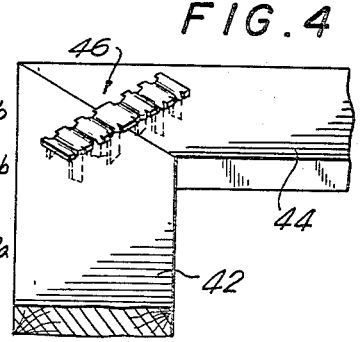
FIG. 4 illustrates, in a fragmentary view, how the fastener of the invention may be used for interconnecting a pair of structural members which are angularly arranged with respect to each other.

The fastener of the invention can be used in many different ways. Thus, instead of connecting structural members 12 and 14, made of wood or the like, in end-to-end relation, it is possible to interconnect a pair of structural members 42 and 44, shown in FIG. 4, extending at right angles to each other. For this purpose only a narrow strip portion 46 of the fastener plate of the invention is required. This strip portion can easily be cut from the plate so as to have rows of prongs as indicated in FIG. 4 which can penetrate into the abutting structural members 42 and 44 in order to connect them to each other in the manner indicated in FIG. 4. It will be noted that even with this relatively small portion 46 of the plate 18 it is possible to achieve the above-described results of the invention because of the oppositely oriented inclined end edges of the prongs, and in addition the same structural advantages, with respect to the strength of the fastener, are maintained with the smaller fastener 46 of FIG. 4.

Thus, with the structure of the invention the fastener plate has a continuous V-groove continuing around each pair of teeth at the adjoining ends of a pair of successive grooves 36, thus forming a yoke which strengthens the teeth. This construction forms an individual entity of the latter pairs of teeth, and the V-grooves make the plate more rigid because of the deformation of the metal thereof. The staggering of the teeth so that the longer teeth are staggered with respect to the shorter ones results in only requiring a fraction of the total power for driving the fastener into the structural members to be initially applied only to drive the longer teeth into the structural members until the shorter teeth engage the structural members, and then all of the teeth are simultaneously driven. Where the teeth are arranged in two groups as shown, only one half of the teeth are initially driven into the structural members, and the shorter teeth will only start to penetrate after the longer teeth are thoroughly embedded. As a result of their partial penetration into the structural members when the shorter prongs or teeth reach the latter, the longer teeth or prongs offer less resistance to penetration, so that in this way also the total power required is reduced.

Because of the staggering of the angular end edges of the prongs, they will penetrate straight into the structural members even though the driving force is applied at an angle which is not perpendicular to the surfaces of the structural members which are initially penetrated by the teeth. The reason for this is that the tips of the prongs will penetrate into the structural members before the driving force, which may be at an undesirable angle, has had an opportunity to misshape the teeth and to disturb the proper penetration thereof into the structural members, and the result is that even though the angle at which the driving force is directed is not ideal, nevertheless the fastener of the invention will have its prongs reliably penetrating perpendicularly through the outer surface of the structural members into the latter. The fastener of the invention has been used with every known method of plate application conventionally used at the present time, including a hydraulic cylinder in a straight press, a punch press in a straight press, and rollers and in all cases successful results have been achieved.

As is apparent particularly from FIG. 3, a pair of prongs are struck from each slot 36 with the pair of prongs respectively projecting from the ends of the slot and with the inclined free ends of each prong being formed by a single cut extending angularly across each slot so that with this single cut the inclined end of one prong will be of an inclination opposite to that of the other prong at the other end of the slot. Furthermore, simply by situating the transverse inclined cut nearer to one end of the slot than the other, the successive prongs respectively situated at the opposed ends of each slot will have the different lengths with the total length of the pair of prongs at the opposed end of each slot being equal to the length of the slot. Moreover, as is apparent from FIG. 2, the shorter side edge of each of the longer prongs is approximately equal to the length of the longer side edge of each of the shorter prongs.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described.

What is claimed is:

1. For use in the fastening together of structural members made of wood or similar material capable of being penetrated by metal prongs, a metal plate having a plurality of prongs projecting from one face thereof, said prongs being composed of two groups of prongs which respectively are of substantially different lengths, so that when driven into a pair of structural members which are to be connected to each other only the group of longest prongs will be required initially to penetrate into the structural members, said plate being formed with slots resulting from striking of said prongs from said plate and a pair of said prongs being respectively situated at opposite ends of each slot and having a total length equal to that of said slot, each prong having a pair of opposed side edges which are respectively of different lengths and terminates in an inclined end edge extending between said side edges of different lengths and providing said prong with a pointed tip terminating at the longer side edge of each prong, the shorter side edges of the longer prongs having a length approximately equal to the longer side edges of the shorter prongs, and the inclined end edges of the longer and the shorter prongs extending at substantially equal angles relative to the axes of the respective prongs.

2. The combination of claim 1 and wherein said prongs are arranged in rows with the successive prongs of each row respectively having their end edges inclined oppositely with respect to each other.

3. The combination of claim 2 and wherein the prongs are arranged in each row with long and short prongs alternating along the row so that each prong of one length is followed in the row by a prong of a different length.

4. The combination of claim 3 and wherein said prongs are arranged in two sets of rows, one of which extends perpendicularly with respect to the other.

5. The combination of claim 4 and wherein said plate is formed, at that face thereof which is opposed to the face from which said prongs extend, with a plurality of parallel V-grooves, and said prongs being struck from those portions of said plate which are formed with said V-grooves, each prong having along its entire length a V-shaped cross section.

6. The combination of claim 5 and wherein said V-grooves are arranged in groups separated from each other by elongated plate portions extending between said groups, and said elongated plate portions being wider than the distance between the successive V-grooves of each group so as to form elongated reinforcing portions of said plates.

7. The combination of claim 6 and wherein the prongs struck from said plate form in the latter slots distributed along said V-grooves, and said slots being arranged in rows extending transversely across said elongated portions of said plates with said plate having between said rows of slots elongated portions which extend perpendicularly across said elongated portions which extend between said groups of grooves so as to form a second set of elongated reinforcing plate portions extending across the elongated reinforcing plate portions which are parallel to and situated between said groups of V-grooves.

8. For use in the fastening together of structural members made of wood or similar material capable of being penetrated by metal prongs, a metal plate having a plurality of prongs of different lengths projecting from one face thereof at substantially right angles thereto, each prong having a pair of opposed side edges of different lengths and an inclined end edge extending between said side edges and providing the prong with a pointed tip terminating at the longer one of said pair of side edges, said prongs being arranged in rows with said end edges of successive prongs of each row being inclined oppositely with respect to each other, the shorter side edges of the longer prongs having a length approximately equal to the longer side edges of the shorter prongs with the inclined end edges of the longer and the shorter prongs extending at substantially equal angles relative to the axes of the respective prongs, said plate being formed with elongated slots respectively having opposed ends from which said prongs project with each slot being formed during striking of a pair of prongs, each slot having a longer prong at one end thereof and a shorter prong at its other end, the total length of which are equal to the length of each slot, and said oppositely inclined end edges being formed by a single cut extending angularly across each slot to provide successive prongs with said oppositely inclined end edges.

9. For use in the fastening together of structural members made of wood or similar material capable of being penetrated by metal prongs, a plate having a plurality of prongs projecting from one face thereof, said prongs being composed of two groups of prongs of different lengths, said plate being formed in a face thereof which is opposed to said one face with a plurality of V-grooves providing said plate with V-groove portions, and said prongs being struck from said V-groove portions of said plate so that each prong has a V-shaped cross section, said plate being formed with slots resulting from striking of said prongs from said plate and said slots respectively having said prongs projecting from opposed ends of said slots so that each pair of prongs at the opposed ends of a given slot have a total length equal to the length of said slot, said slots all extending longitudinally along said V-groove portions of said plate so that each prong has V-shaped cross sections along its higher length, each prong having a pair of opposed side edges which are respectively of different lengths and terminates in an inclined end edge extending between said side edges of different lengths and providing said prong with a pointed tip terminating at the longer side edge of each prong, the shorter side edges of the longer prongs having a length approximately equal to the longer side edges of the shorter prongs, and the inclined end edges of the longer and the shorter prongs extending at substantially equal angles relative to the axes of the respective prongs.

References Cited

UNITED STATES PATENTS

| 1,581,887 | 4/1926 | Taplin | 85—49 |
| 3,212,389 | 10/1965 | Sandford | 85—13 |
| 3,298,151 | 1/1967 | Jureit | 85—13 |
| 386,742 | 7/1888 | Grellner | 85—13 X |

FOREIGN PATENTS

| 1,030,482 | 5/1966 | Great Britain. |

RAMON S. BRITTS, Primary Examiner